Nov. 9, 1965 H. BAUER 3,216,334
GAS COMPRESSORS
Filed March 2, 1964

Helmut Bauer
INVENTOR

BY Wenderoth, Lind & Ponack
ATTORNEYS

United States Patent Office 3,216,334
Patented Nov. 9, 1965

3,216,334
GAS COMPRESSORS
Helmut Bauer, Basel, Switzerland, assignor to Maschinenfabrik Burckhardt A.G., Basel, Switzerland, a company of Switzerland
Filed Mar. 2, 1964, Ser. No. 348,333
Claims priority, application Switzerland, Mar. 8, 1963, 2,960/63
12 Claims. (Cl. 92—156)

Sealing of the clearance between a piston reciprocating in a cylinder with fine clearance, obtained for example by grinding-in, by means of a film of lubricant between the piston and cylinder is known for small pumps and compressors and is perfectly tight against small pressures. Perfect tightness is achieved if the adhesion forces between the lubricant and the surfaces of the cylinder and piston are so great that the operating pressure cannot drive the lubricant out of the clearance. Naturally this is only possible with very narrow clearances and moderate pressures.

With large piston diameters the working clearance must be made so great that as a general rule the adhesion forces are no longer sufficient for perfect tightness. With high operating pressures in addition the cylinder is expanded in diameter by the pressure and the clearance is thus increased. Accordingly with large dimensions or high operating pressures perfect tightness can no longer be relied on but certain leakage losses continuously occur through the clearance. These leakage losses are acceptable with pumps in cases in which the medium being pumped is itself a lubricant because they only amount to a certain reduction of the volumetric efficiency but do not endanger the reliability of operation. In gas compressors however leakage losses reduce the reliability of operation because there is obviously the danger of abrasion as soon as the lubricant has been driven out of the clearance and the gas blows through.

The purpose of the invention is to make it possible to use the above mentioned sealing arrangement in high pressure gas compressors in which the reciprocating compressor piston compresses gas into a compression space in the compressor cylinder.

According to the present invention a substantial reserve of lubricant is stored in front of and in communication with the clearance to be sealed between the piston and cylinder, which seals the clearance by maintaining lubricant therein notwithstanding small leakage losses. The reserve of lubricant is separated from the gas compression space by means enabling the volume of the reserve to vary within limits and the quantity of lubricant lost by leakage is continuously or periodically replaced from a supply under pressure outside the cylinder.

Four examples embodying the invention are diagrammatically illustrated in the accompanying drawings each figure being an axial section.

Figure 1:
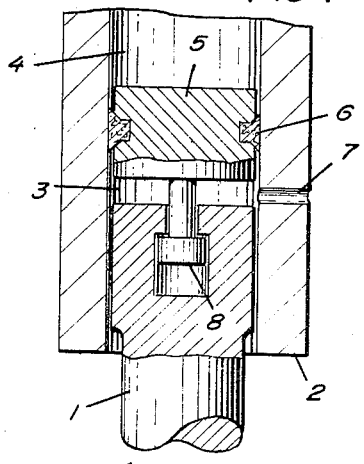
FIGURE 1 is a partial axial cross-sectional view of one form of the invention.

In the example shown in FIGURE 1 a compressor piston 1 moves with very fine clearance in a compressor cylinder 2 and the space 3 above the piston is filled with a reserve of lubricant; the quantity of lubricant in the space 3 as a precaution is made larger than the quantity which escapes during one cycle through the clearance between the piston 1 and the cylinder 2. The space 3 is separated from the gas filled compression space 4 by a second piston 5 which is freely movable in relation to the piston 1 and separates the gas filled compression space 4 from the oil filled space 3 by a packing 6 which coacts with the cylinder 1 and is located between the reserve of lubricant and the space 4. In this way no lubricant can rise into the compression space 4 but the same pressure always reigns in the oil filled space 3 as in the gas filled space 4. The packing 6 is therefore not stressed from above or below by an unbalanced pressure because the same pressure acts on both sides.

At a suitable position in the stroke lubricant lost from the space 3 is replaced through a bore 7. Obviously it is necessary to replace exactly the same amount of lubricant as has escaped through the clearance between the piston 1 and the cylinder 2; if too little lubricant were replaced, in time the piston 5 would seat on the piston 1 and there would be no lubricant left to seal the clearance between the piston 1 and the cylinder 2. The result would be that the gas would blow through and lubrication and reliability of operation be endangered.

If on the other hand too much lubricant were supplied to the space 3 the volume of lubricant in the space 3 would increase and the floating piston 5 would be forced away from the main piston 1 so that finally it would strike against the head of the cylinder which also cannot be permitted. The free floating piston 5 is therefore provided with a stroke-limiting device 8 which limits the maximum volume of the space 3.

The nature of the device which replaces lubricant through the passage 7 under the necessary pressure is unimportant to the invention and accordingly is not shown in FIGURE 1. Advantageously it consists of a pressure feed in which the lubricant is stored under the necessary pressure. This pressure feed can for example be under pneumatic or spring pressure and the problem of refilling the pressure feed at the proper time can be solved in a simple manner by known technical means.

Obviously the space 3 must be refilled at the correct instant, that is when it is opposite the passage 7. If the distance between the main piston 1 and the floating piston 5 is greater than the stroke length the passage 7 will be constantly in communication with the space 3 and replacement from the feed device will take place continuously. If the space between the free piston 5 and the main piston 1 is less than the stroke length a controlled valve must open the passage 7 as soon as the space 3 is in a suitable position. This also is easily achieved by known technical means. In itself any desired position in the stroke can be chosen for replacement of the oil. It is desirable however to effect replacement at the inner dead centre because at this point the gas pressure in the space 4 is at its lowest because then the lowest oil pressure suffices to recharge the space 3.

The invention just described with reference to FIGURE 1 can be given effect in other forms and one such other form is shown by way of example in FIGURE 2. The reference numbers in this figure indicate the same or corresponding parts as in FIGURE 1.

In this figure therefore, 1 is the compressor piston ground with small clearance into the compressor cylinder 2, 3 is the space for the reserve of lubricant which is to seal the clearance between the piston 1 and the cylinder 2 and 4 is the compression space filled with gas compressed by the piston 1. By means of a second piston 5' in this case ground into and working in a bore in the piston 1, the pressure in the space 3 for the reserve of lubricant and the gas compression space 4 is kept constantly equal and the gas being pumped and the lubricant are separated by a packing 6 on the piston 1 coacting with the cylinder 2, located between the space 4 and the location where the reserve of lubricant communicates with the clearance between the piston 1 and cylinder 2; 7 is the passage serving for refilling the space 3 and the movement of the free piston 5 is limited by an abutment 8'.

Figure 2:
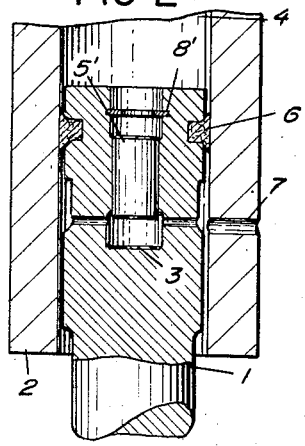
FIGURE 2 is a similar view showing a modification.

An arrangement as diagrammatically illustrated in FIGURE 1 or FIGURE 2 completely suffices for all cases in which the operating conditions of the compressor are precisely known and in which especially it is known what the gas pressure is at the instant when the space 3 is in communication with the passage 7. It is then possible so to regulate the pressure in the feed device for lubrication that it exactly corresponds with the gas pressure in the space 4 at this instant and that one sided overloading of the packing 6 can be avoided.

Figure 3:
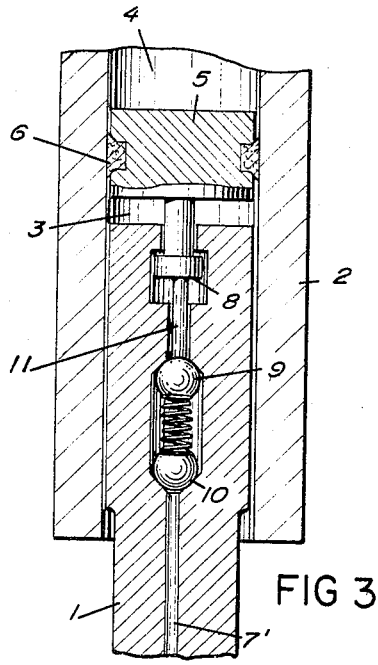
FIGURE 3 is a similar view showing a further modification of the invention.

If however a compressor has to work under operating conditions which vary considerably, and if in consequence one sided loading of the seal 6 could not be avoided, another arrangement is preferred to avoid overloading which is diagrammatically illustrated in FIGURE 3.

As before 1 is the ground-in piston which moves with small clearance in the cylinder 2 and 3 is the space for lubricant which is separated from the gas space 4 by the freely movable piston 5 and the packing 6. Also 7' indicated the refilling passage but this passage is now provided along the axis of the piston 1. When the space 3 has been refilled with a sufficient quantity of lubricant, a valve 9 will close under the urge of a return spring, the piston 5 then being at the maximum distance permitted by the stroke-limiting means from the piston 1. Further inflow of lubricant is thus prevented and overloading of the packing 6 is avoided whatever pressure there may be in the space 4 at this instant.

At the next movement of the main piston 1 a certain quantity of lubricant will be lost from the space 3 because it escapes through the clearance between the piston 1 and the cylinder 2 whereby the piston 5 is displaced from the position of maximum volume of the space 3 and the valve 9 is again opened by the movement of the piston 5 acting in this example through a push rod 11. At the same time the gas pressure in the space 4 rises and thus also the pressure of lubricant in the space 3. In order to prevent this pressure which may easily be higher than the lubricant pressure in the feed device from reaching the feed device, a non-return valve 10 is provided between the valve 9 and the feed device.

Figure 4:
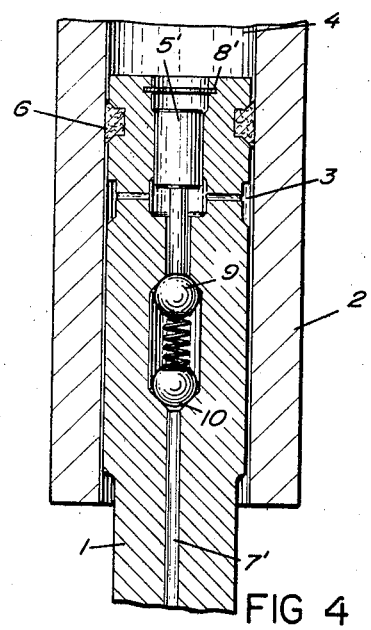
FIGURE 4 is a still further similar view showing a further modification.

In FIGURE 4 a further example is illustrated. As this only differs from FIGURE 3 in a similar manner to that in which FIGURE 1 differs from FIGURE 2 and the same reference numbers are used as in FIGURE 3 further description is unnecessary.

A supply of lubricant to the bore 7' which in FIGURES 3 and 4 takes place along the axis of the piston can be effected by various means which are omitted here because they are no part of the invention. The pressure feed device and charging pump for the pressure feed device could, for example, be mounted inside the piston rod or inside the crosshead. It is also possible to mount these members externally and convey the lubricant through a movable pipe, a jointed pipe or through a packing. The technical means for solving this problem are known and are therefore not shown.

The layer of lubricant stored in front of the piston clearance could also be separated from the gas space of the compressor by a flexible diaphragm.

The above described piston clearance seal makes it possible to build gas compressors of very high output the pistons of which are perfectly gas tight because the unavoidable leakage losses consisting only of lubricant can easily be replaced. At the same time it is possible to effect practically oil-free compression because the packing 6 between the gas filled space 4 and the oil filled space 3 is not subjected to any one sided overloading and cannot therefore be harmed in its action by premature wear.

What I claim is:

1. Means for sealing the clearance between the piston and cylinder of a gas compressor having a cylinder with a gas compression space therein and a compressor piston reciprocating with fine clearance in said cylinder to compress gas into said space, comprising a substantial reserve of lubricant stored in front of and in communication with the clearance between said piston and cylinder, means separating said reserve from said gas compression space and enabling the volume of said reserve to vary within limits, and means for replacing from outside said cylinder, lubricant lost from said reserve by leakage through said clearance.

2. In a gas compressor having a compressor cylinder with a gas compression space therein and a compressor piston reciprocating with fine clearance in said cylinder to compress gas into said space, a substantial reserve of lubricant stored in front of and in communication with the clearance between said piston and cylinder, said reserve maintaining lubricant in said clearance notwithstanding small leakage losses through the clearance and so sealing the clearance.

3. A gas compressor as set forth in claim 2 wherein a second freely movable piston is provided separating said reserve of lubricant from said gas compression space.

4. A gas compressor as set forth in claim 2 also including freely movable means separating said reserve of lubricant from said gas compression space, and a feed device outside said compressor cylinder containing a supply of lubricant under pressure, a passage being provided through which lubricant can pass from said feed device to said reserve of lubricant.

5. A gas compressor as set forth in claim 4 further including means for limiting the movement of said freely movable means in relation to said compressor piston and so determining the maximum volume of said reserve of lubricant.

6. A gas compressor as set forth in claim 5 wherein said freely movable means is a second piston.

7. A gas compressor as set forth in claim 6 wherein said second piston works in said compressor cylinder between said compressor piston and said gas compression space, and said second piston carries a packing coacting with said compressor cylinder and located between said reserve of lubricant and said gas compression space.

8. A gas compressor as set forth in claim 6 wherein said second piston works in a bore in said compressor piston, and wherein said compressor piston carries a packing coacting with said compressor cylinder and located between said gas compression space and the location where said reserve of lubricant communicates with the clearance between said compressor piston and compressor cylinder.

9. A gas compressor as set forth in claim 4 wherein said passage traverses the wall of said compressor cylinder.

10. A gas compressor as set forth in claim 4 wherein said passage extends axially within said compressor piston.

11. A gas compressor as set forth in claim 5 wherein said passage extends axially within said compressor piston, the compressor also including a valve in said passage, means actuated by movement of said freely movable means away from the position of maximum volume of said reserve of lubricant for opening said valve to admit lubricant to said reserve, and a non-return valve in said passage.

12. In a gas compressor having a compressor cylinder with a gas compression space therein and a compressor piston reciprocating with fine clearance in said cylinder to compress gas into said space, a second piston freely movable in relation to said compressor piston and enclosing between itself and said compressor piston a storage space in front of and communicating with the clearance between said compressor piston and said compressor cylinder, limiting means checking the movement of said second piston in a direction towards said gas compression space and thus limiting the maximum volume of said storage space, a packing between the assembly consisting of said two pistons engaging said compressor cylinder nearer said gas compression space than the location where said storage space communicates with said clearance, a passage extending from said storage space axially through said compression piston in a direction away from said compression space, a feed device outside said compression cylinder for supplying lubricant under pressure to said passage, a first valve in said passage, means urging said valve into closed position, means actuated by said second piston for opening said valve except when said second piston is checked by said limited means, and a non-return valve in said passage between said first valve and said feed device.

References Cited by the Examiner
UNITED STATES PATENTS

| | | | |
|---|---|---|---|
| 309,686 | 12/84 | Bogert | 92—160 |
| 1,597,706 | 8/26 | Aldous | 92—160 X |
| 1,768,633 | 7/30 | Ries | 92—160 |
| 1,774,967 | 9/30 | Ellis | 92—160 |
| 2,748,718 | 6/56 | MacClatchie | 92—160 |
| 2,968,287 | 1/61 | Creighton | 92—160 |

KARL J. ALBRECHT, *Primary Examiner.*